Patented Aug. 10, 1926.

1,595,766

UNITED STATES PATENT OFFICE.

ALBERT K. EPSTEIN, OF CHICAGO, ILLINOIS.

EGG PRODUCT AND PROCESS FOR PRODUCING THE SAME.

No Drawing.   Application filed October 5, 1925. Serial No. 60,677.

My invention relates to egg products and process for producing the same, being directed more particularly to a new composition of matter to be used as an emulsifying agent with vegetable oils, vinegar, spices, condiments and other ingredients in the preparation of what is known as salad dressing or mayonnaise products, and process for making this emulsifying agent.

In the manufacture of salad dressing and mayonnaise the vegetable oils are emulsified with the vinegar and other ingredients by means of fresh eggs. The egg product forms a considerable portion of the salad dressing so a saving in cost of egg product is important. Therefore, from an economic standpoint it would be an advantage to be able to use frozen storage egg products, but heretofore such frozen egg products have not been very suitable for emulsifying agents in connection with the manufacture of mayonnaise products. When the content of an egg is frozen to a solid mass and then thawed out, the product loses its original emulsifying properties. It becomes thick and lumpy after thawing out as some of the protein substance of the egg material has become denatured during freezing and has changed its colloidal condition and its emulsifying capacity.

In United States Patent No. 1,426,559 I have described a process consisting of the addition of a suitable quantity of glycerine to egg material before freezing and then freezing the mixture. As a result of this process, the thawed out egg product resembles, the egg product before it was subjected to freezing in that it is not lumpy, but fluid and smooth. Such product, however, is substantially less viscous than the original egg substance, that although suitable for baking purposes, does not serve efficiently as an emulsifying agent for mayonnaise product.

My present invention consists in the production of an improved egg product and process for producing the same, as a result of which the thawed out egg product, although liquid in consistency, is more viscous than heretofore, having the proteins in a more dispersed condition and possesses effective emulsifying properties and is suitable in the manufacture of salad dressings and more particularly mayonnaise dressing.

In carrying out the improved process, the eggs are candled in order to select those of an edible nature and eliminate bad ones. Each individual usable egg is opened and the yolk matter is separated from the white. The yolk substance is allowed to drop in one cup and the white in another. The yolk is also smelled to be sure that it has no odor and then dropped into a large container. The yolks are then passed through a strainer to take out any pieces of shell or other foreign matter and by means of a pump the yolk material is carried over into a churn fitted with a stirring or mixing device.

I treat the yolk mixture so that it will retain its fluidity and viscosity after freezing and thawing, by adding a quantity of citric acid dissolved in glycerine. The contents of the churn are now mixed sufficiently to distribute the glycerine citric acid solution throughout the yolk mass. The product is then drawn off into cans and subjected to a sufficiently low temperature to freeze to a solid product, a temperature of 10 degrees or 12 degrees F. below zero being suitable for this purpose.

It is now kept in this solid condition until it is to be prepared for use. Before using this product is thawed out. The thawed out product will not be lumpy, but during thawing will return to a fluid condition, and of the proper viscosity as was the original yolk material before freezing.

In separating the yolks from the whites, a portion of the white substance will adhere to the yoke and hence the yolk product will contain a small amount of the white. This is not detrimental to the process. However it is advisable to have as little of the white material as possible mixed with the yolks.

In treating a yolk batch, I add to every 94¾ lbs. of yolk material 5 pounds of pure glycerine and ¾ pound of citric acid. The citric acid is dissolved first with the glycerine and the glycerine citric acid solution is added in small quantities to the yolk material and mixed for a few minutes. I do not limit my invention to the above specified quantities, but such suitable quantity and proportion of the above ingredients may be combined as will permit the mixture to be turned into a solid mass by freezing, and when thawed out will return to substantially its original fluidity and have a viscosity substantially not less than the original yolk material.

I have found that when the acid itself is added to the yolk material and the mixture allowed to freeze, the product when thawed out will be thick, as a change has apparently taken place in the water imbibing capacity of the protein. On the other hand, if glycerine itself is added and the product subjected to freezing, the thawed out product will not be lumpy but more fluid and sufficiently less viscous than the original yolk product before freezing, to prevent its successful use for mayonnaise. If a suitable amount of glycerine and acid are added to the yolk mass and the mixture subjected to freezing, a different result is obtained than by the addition of either one of the two substances by itself. With my improved product, when thawed out it will not be jelly like but will be fluid and of the proper viscosity to make a good emulsifying agent for the vegetable oils in the manufacture of mayonnaise.

I do not limit my invention to glycerine only and to citric acid only. I have found that any water soluble organic compound having one or more hydroxyl groups which have the capacity of preventing the denaturing of protein material during freezing such as dextrose, lactose, sucrose, ethyl alcohol, ethylene glycol, glycerine and their equivalent in combination with a suitable edible acid such as acetic, phosphoric, tartaric, lactic, malic or succinic or their equivalent are suitable for producing my improved product.

It is my theory that the addition of an edible organic substance, such as glycerine, containing one or more OH or hydroxyl groups capable of forming hydrates, combines with a portion of the moisture in the egg substance to form such hydrates, thus preventing the crystallizing of the water to ice when the egg material is subjected to a freezing temperature, and therefore the product retains its fluidity after thawing out. The addition of a suitable amount of acid, to a suitable organic substance as stated containing one or more hydroxyl groups capable of preventing the protein material from denaturing during freezing, acts upon the protein material of the egg substance by increasing sufficiently the imbibing capacity of the protein for the water, thus making it more viscous but still sufficiently fluid.

Thus by taking substances of the two classes in suitable proportion, adding them to egg material such as yolk, and subjecting them to freezing temperature, and then allowing the mass to thaw out, a product is obtained of greater viscosity than heretofore but still in the fluid state. Such product has good emulsifying properties and is an excellent substance to be used as an emulsifying agent in the manufacture of mayonnaise dressing.

What I claim as new and desire to secure by United States Letters Patent is:

1. The method of producing an emulsifying agent consisting of adding to egg yolk an edible water soluble organic compound containing a hydroxyl group capable of preventing denaturing of egg protein during freezing in combination with an edible acid for increasing the water imbibing capacity of the protein, freezing the mixture and maintaining it frozen until thawing it out for use, the amount of added ingredients to be sufficient to retain the fluidity without diminishing the viscosity of the product when thawed.

2. The method of producing an emulsifying agent consisting of adding to egg yolk an edible water soluble organic compound containing a hydroxyl group capable of preventing denaturing of egg protein during freezing in combination with citric acid, freezing the mixture and maintaining it frozen until thawing it out for use, the amount of added ingredients to be sufficient to retain the fluidity without diminishing the viscosity of the product when thawed.

3. The method of producing an emulsifying agent consisting of adding to egg yolk glycerine and citric acid, freezing the mixture and maintaining it frozen until thawing it out for use, the amount of added ingredients to be sufficient to retain the fluidity without diminishing the viscosity of the product when thawed.

4. The method of producing an emusifying agent consisting of adding to egg yolk glycerine in combination with an edible acid for increasing the water imbibing capacity of the protein, freezing the mixture and maintaining it frozen until thawing it out for use, the amount of added ingredients to be sufficient to retain the fluidity without diminishing the viscosity of the product when thawed.

5. As a new article of manufacture, egg yolk removed from the shell combined with a water soluble edible organic compound containing a hydroxyl group capable of retaining the fluidity of the egg substance when frozen and subsequently thawed out, and an organic edible acid for increasing the water imbibing capacity of the egg protein, and frozen below the temperature of bacterial decomposition.

6. As a new article of manufacture, egg substance removed from the shell combined with a water soluble edible organic compound containing a hydroxyl group capable of retaining the fluidity of the egg substance when frozen and subsequently thawed out, citric acid, and frozen below the temperature of bacterial decomposition.

7. As a new article of manufacture, egg yolk removed from the shell combined with glycerine, and an organic edible acid for increasing the water imbibing capacity of the egg protein, and frozen below the temperature of bacterial decomposition.

8. As a new article of manufacture, egg yolk removed from the shell combined with citric acid and gylcerine, and frozen below the temperature of bacterial decomposition.

In witness whereof, I hereunto subscribe my name this 21st day of September, 1925.

ALBERT K. EPSTEIN.